Dec. 31, 1963    O. E. SEIFERTH ETAL    3,116,153
HERMETICALLY SEALED FOOD PACKAGE
Filed Nov. 13, 1962    3 Sheets-Sheet 1
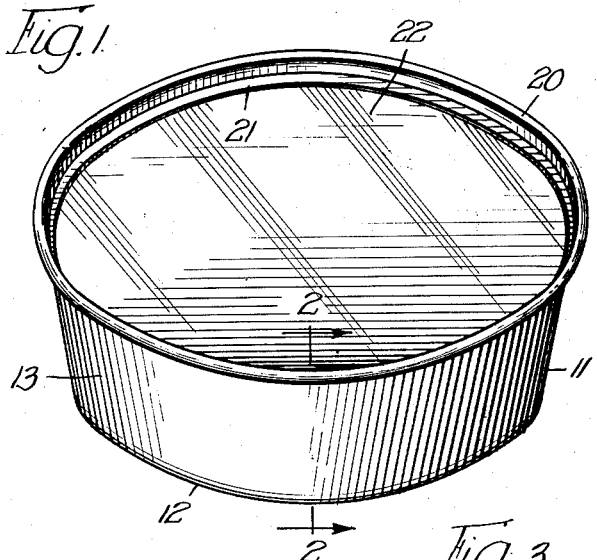
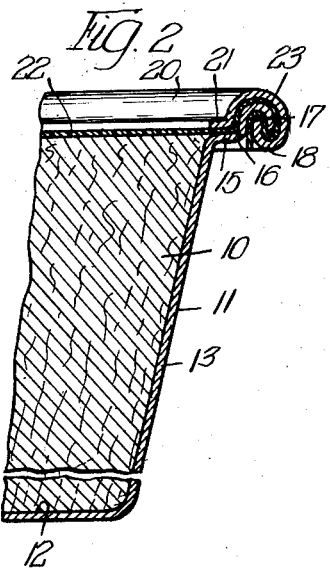
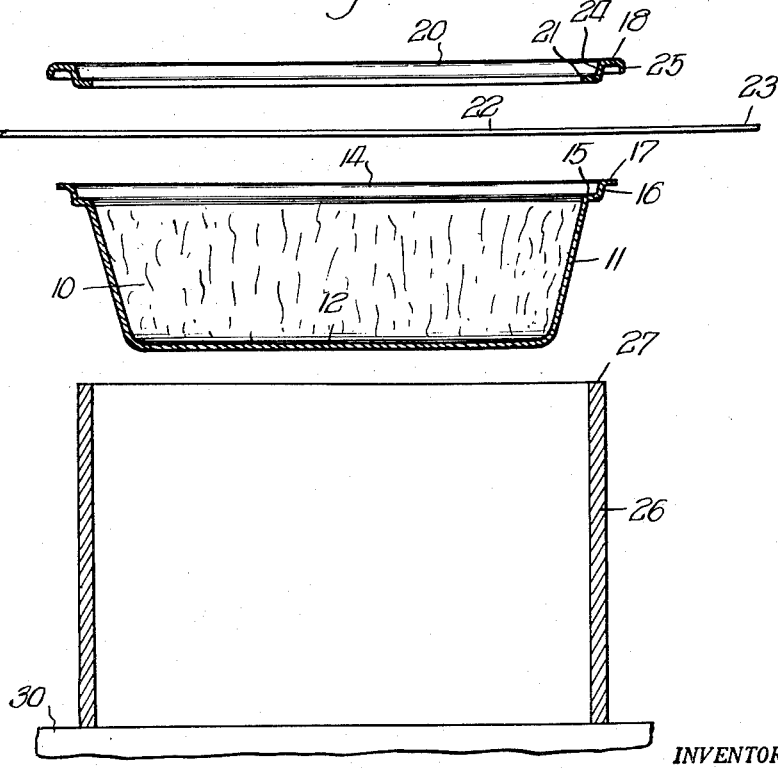
INVENTORS.
Oscar E. Seiferth,
BY Glenn M. Austin,
Cromwell, Greist + Warden Dec. 31, 1963  O. E. SEIFERTH ETAL  3,116,153
HERMETICALLY SEALED FOOD PACKAGE
Filed Nov. 13, 1962  3 Sheets-Sheet 2
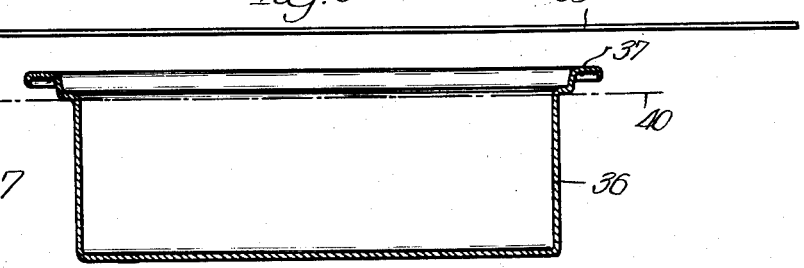
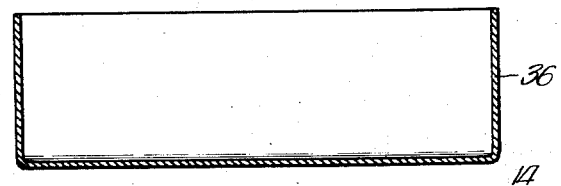
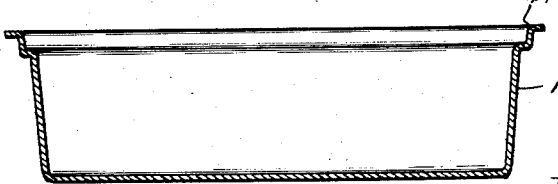
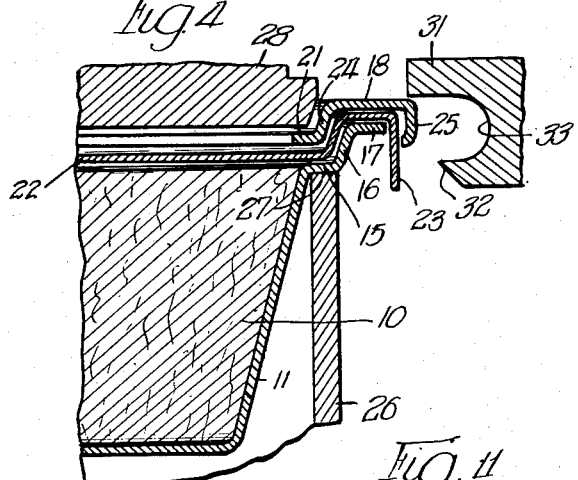
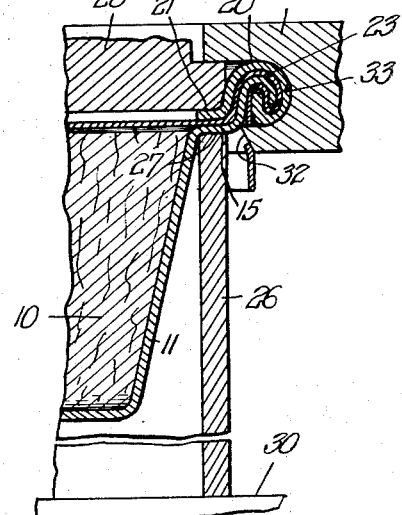
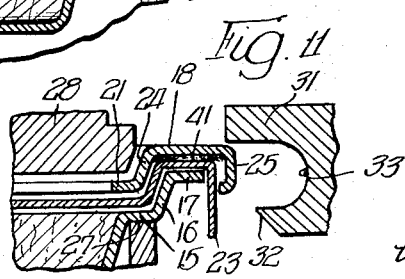
INVENTORS.
Oscar E. Seiferth,
BY Glenn M. Austin,
Cromwell, Greist & Warden
ATTYS

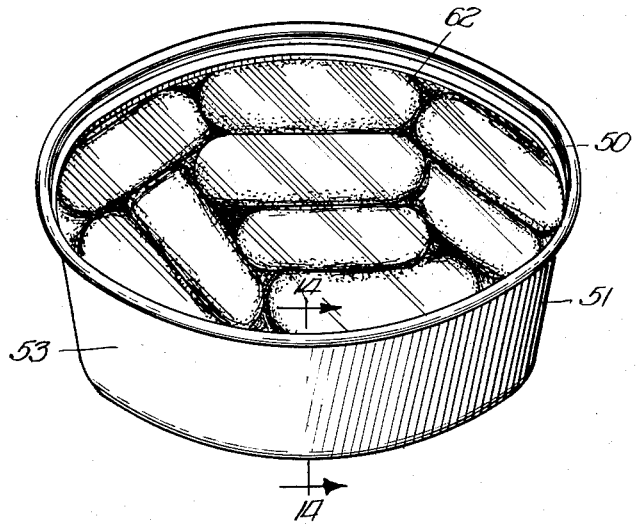
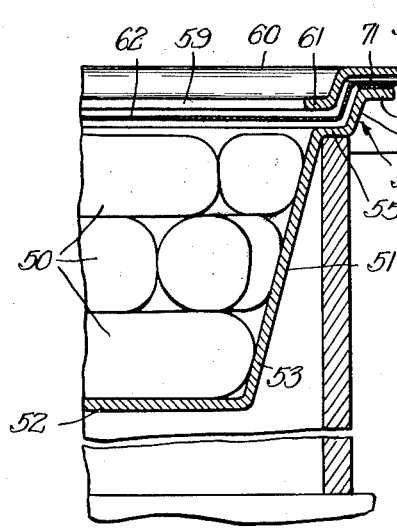
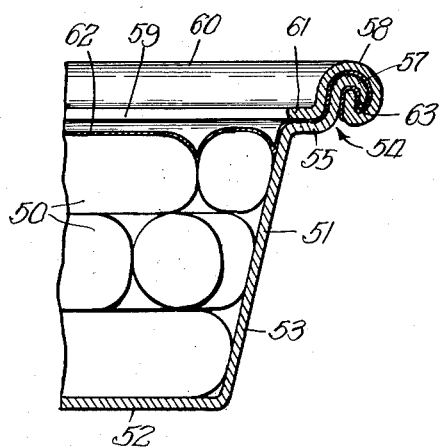

3,116,153
HERMETICALLY SEALED FOOD PACKAGE
Oscar E. Seiferth and Glenn M. Austin, Madison, Wis., assignors to Oscar Mayer & Co., Inc., Chicago, Ill., a corporation of Illinois
Filed Nov. 13, 1962, Ser. No. 236,887
10 Claims. (Cl. 99—171)

This invention relates to packaging and is more particularly concerned with improvements in a package which is especially suitable for enclosing foods so that they can be displayed in a sanitary and appealing manner and which will preserve the contents while stored preparatory to its use.

This application is a continuation-in-part of copending application Serial No. 849,478, filed October 29, 1959, now abandoned.

It is a general object of the invention to provide a food package which affords maximum protection to the contents while displaying the same in an attractive and appealing manner, which will preserve the food against spoilage for a substantial period, which is readily opened to provide access to the contents, and which is of such a nature that it is readily adaptable to production packaging methods.

It is a more specific object of the invention to provide a package which is characterized by a well designed, rigid, one-piece body, a transparent plastic top and an hermetic seal connecting the body and top, the body having sufficient strength to withstand the abuse encountered in handling and shipping operations and the relatively high pressures and temperatures developed during processing when the contents of the package are to be processed in the package, and the top having a low gas transmission rate and being capable also of withstanding relatively high temperatures and pressures such as encountered in food processing or similar operations.

It is a still more specific object of the invention to provide a package which is characterized by a container formed of relatively light gauge material, for example, aluminum or tin plate, and a transparent plastic sheet covering the entire opening of the container so as to afford a full view of the top of the contents and facilitate opening and removal thereof, with the cover being hermetically sealed to the container by a narrow sealing ring, preferably of metal.

It is a further object of the invention to provide a package for food or similar products which comprises a container body of relatively light rigid material, for example, plastic, aluminum or tin plate which is provided with an outwardly stepped flange around the top edge thereof, a top closure member which is formed of a relatively rigid and relatively thin material with a depressed apertured center portion and an outwardly extending edge flange providing a downwardly facing pocket which closure member is positioned on the top of the container body with the outer portion of the stepped flange received in the pocket thereof and with the marginal edge of the aperture vertically aligned approximately with the inner edge of the stepped flange and a sheet of flexible transparent plastic film which has a very low gas transmission rate stretched over the product in the container body so as to conform to the top of the product, with the marginal portions of the film being trapped between the flanges of the container body and the closure member together with a gasket material which grips the film in a tightly coiled hermetic seam whereby the plastic sheet may be cut along the edge of the center aperture in the closure member to permit the product to be removed from the container as a solid mass through the closure aperture.

It is a still further object of the invention to provide a package for food or similar products which is characterized by a container adapted to be preformed of relatively light material preferably into relatively shallow tray-like form and provided with an outwardly stepped flange around the periphery thereof which permits the container to be supported in the open upper end of an upright hollow form for a seaming operation with a transparent covering sheet and an apertured covering disc, the latter having a seaming flange formation which cooperates with the stepped flange on the container so as to facilitate the formation of a crimped or rolled seam for securing the flange on the container with the marginal portions of the covering sheet and the seaming flange formation on the disc.

It is another object of the invention to provide a method of forming a packaging receptacle of tray-like form and a lid therefor from a single piece of relatively thin gauge sheet metal which comprises die stamping the sheet to form an open top tray structure with a top edge which has an outwardly directed stepped flange formation, cutting on a line at the inner edge of said stepped flange formation and separating the apertured lid member so formed from the remainder of the tray structure, and further die stamping the tray to provide a receptacle having a stepped flange on the edge thereof with a cross section corresponding to the cross section of the flange on the lid member whereby the lid member may be positioned on the receptacle with the flange formations in superimposed relation for forming a connecting seam.

It is still another object of the invention to provide a method of forming a packaging receptacle of tray-like form and a top closure member therefor from a single piece of relatively thin gauge sheet metal which comprises die stamping the sheet to form an open top tray structure with a top edge having an outwardly directed stepped flange thereon, cutting on a line at the inner edge of the stepped flange and separating the apertured top closure member so formed from the remainder of the tray structure, and further die stamping the remainder of the tray structure to provide a receptacle of pie pan shape having a stepped flange corresponding susbtantially to the shape of the flange on the closure member whereby the closure member may be positioned on the receptacle with the flanges in interengaged relation for forming a connecting seam by a crimping operation.

It is a further object of the invention to provide a method of forming a package of a food product which comprises providing a receptacle of relatively thin gauge deformable material which is preformed to provide a pie pan shape and a stepped flange at the edge thereof, filling the receptacle with a quantity of the product to be packaged, supporting the filled receptacle in the upper end of an upright hollow cylindrical form which has a relatively narrow top edge on which an inner flange portion of the stepped flange on the receptacle is seated, placing a sheet of transparent plastic film over the open top of the filled receptacle, placing a closure member of deformable material thereon which closure member is preformed to provide an apertured center portion and an edge flange portion which nests with the stepped flange on the receptacle and crimp sealing the outermost portions of the flanges while the assembly is supported on said form.

These and other objects and advantages of the invention will be apparent from a consideration of the package and the method of forming the same, which are illustrated in the accompanying drawings wherein:

FIGURE 1 is a perspective view of a completed package which embodies therein the principal features of the invention;

FIGURE 2 is a fragmentary section taken on the line 2—2 of FIGURE 1, to an enlarged scale;

FIGURE 3 is an exploded sectional view showing the packaging elements arranged above a tubular support member on which the package elements are supported while a connecting seam is formed;

FIGURE 4 is a fragmentary section, to an enlarged scale, on a diameter of the support member with the package elements assembled thereon in proper relationship for forming the crimped seam at the top margin of the package;

FIGURE 5 is a fragmentary section similar to FIGURE 4 with the support member and the package elements clamped in the final position in which the crimped seam is completed;

FIGURES 6 to 10 illustrate a method of forming certain of the packaging elements from a single sheet of stock material;

FIGURE 11 is a fragmentary section, simialr to FIGURE 4, illustrating a modification in the seam forming elements;

FIGURE 12 is a perspective view of another form of the package embodying the invention;

FIGURE 13 is a fragmentary section to an enlarged scale on a diameter of the package with the package elements assembled in proper relationship just prior to the forming of the crimped edge seal or seam; and FIGURE 14 is a fragmentary section to an enlarged scale, taken on the line 14—14 of FIGURE 12.

The form of the package which is illustrated particularly in FIGURES 1 and 2 of the drawings comprises a quantity of a product 10 which may be a food, such as liver sausage, chili con carne, cheese or the like, supported in a bottom container 11 which is of tray-like or pie pan form. The container 11 is preformed of a relatively light sheet material and comprises a bottom wall 12, an upwardly and outwardly slanting peripheral wall section 13 which terminates at its top edge in an outwardly directed stepped flange formation 14. The flange formation 14 includes an inner flange 15 which is in a plane parallel with the bottom wall 12, an upwardly and outwardly slanted peripheral wall section 16 and an outwardly extending seaming flange 17, which, as shown in FIGURE 2, is coiled into tight seam forming relation with a cooperating outwardly extending flange formation 18 on a seam forming ring 20. The seaming ring 20 has a narrow inwardly directed flange portion 21 which is adapted to be seated on the inner flange 15 of the container 11. A sheet of transparent film material 22 is interposed between the container 11 and the closure or seam forming ring 20 so as to cover the entire open top of the container 11, the marginal portions 23 of the cover sheet 22 being reversely coiled about the ends of the seaming flange formations 17 and 18 so that it is tightly clamped between the same when the seaming operation is completed.

The package, as illustrated, is especially adapted for use in the marketing of food products but it may be used for other products of a similar nature where it is desirable that the product be enclosed in an hermetically sealed package formed of materials which are impervious to the transmission of moisture, flavor and the like, and which permit at least a portion of the product to be viewed. The package is suitable for any product for which it is desirable to provide airtight protection so as to preserve the product against spoilage or deterioration for a substantial period of time. Also, it is particularly suitable for packaging an uncooked food product which it may be convenient to prepare, or process, while it is in the package, by boiling in water or the like. With such a product, the consumer may cook the material immediately upon receiving the package or the package may be stored for a period of time and then subjected to the cooking process.

The container 11 may be preformed from various materials, depending upon the nature of the product which is to be packaged. For products of a type in which only a portion of the product need be displayed, the container 11 is preferably formed of a relatively thin or light gauge aluminum so as to enable it to be economically manufactured with little material. The container 11 may, however, be preformed of a plastic sheet or film of the type which is hereinafter referred to as suitable for the cover sheet 22.

The sealing ring 20 is fabricated of a material of such a nature that it will permit a crimped seam to be formed with the peripheral edge portion thereof which forms the seaming flange 18 being coiled during the seaming operation. It is preformed or preshaped, preferably, from a relatively light gauge steel or aluminum sheet material. As illustrated, the sealing ring 20 has its center portion removed so as to permit the contents of the package to be observed through the transparent covering film 22 which cooperates with the ring 20 in forming the cover for the open top of the container 11. The removal of the center portion leaves the sealing ring 20, as initially formed, with a relatively narrow inner flange 21 which extends inwardly from the generally cylindrical wall section 24, the latter constituting the inner side of the outwardly extending inverted channel shaped seaming flange portion 18 which has its outer side 25 curved downwardly and inwardly, as shown in FIGURES 3 and 4.

The covering sheet 22 is preferably a plastic film material having a low gas transmission, such as, "Mylar" (an oriented linear polyester resin). The cover sheet 22 may, however, be formed of other plastics having similar characteristics such as "Saran" (a vinylidene chloride polymer), vinyl, polyethylene and cellulose acetate, for example. While the cover sheet 22 is preferably thin and flexible, it may be of a semi-rigid nature. Any combination of the plastics referred to may be employed as a cover sheet, for example "Saran" coated "Mylar," the selection of the same being dependent upon the character of the product which is to be enclosed in the package.

In forming the package of FIGURES 1 and 2, the container 11 and the sealing ring 20, which are preshaped or preformed to provide them with the cross section illustrated in FIGURES 3 and 4, are assembled with a predetermined quantity of the product 10 on a support or form 26 and the seaming operation is accomplished in a conventional can closing machine. A series of upright traveling forms 26, which are in the nature of tubular sections, are provided for receiving the package assembly. The internal diameter of each form 26 is approximately the same as the external diameter of the container 11 at the junction of the stepped flange formation 14 with the body or side wall 13 of the container, so that, when the container 11 is filled with the product 10 which is being packaged, the filled container may be supported in the open upper end of the form 26 with the upper edge portion 27 of the form 26 engaging the bottom surface of the inner flange 15 and the remainder of the flange formation 14 extending radially outwardly of the outer peripheral surface of the form 26. The cover sheet 22 is then positioned over the top of a container 11 with the marginal portions 23 thereof draped over the seaming flange 17, as shown in FIGURE 4, after which the sealing ring 20 is positioned so that the sealing flange 17 on the container 11 is seated in the downwardly facing channel which is provided by the seam forming portion 18 of the sealing ring 20. This brings the inwardly directed flange 21 of the sealing ring 20 into position above the inner flange 15 of the container 11 so that when the assembly is moved into proper position relative to the seaming head of the closing machine the holding fixture or clamp 28 will move into clamping position as shown in FIGURES 4 and 5 and the assembly will be clamped between the lifter plate 30 on which the form 26 is supported and the holding fixture 28 for the seaming operation by the seaming or curling rolls 31 which are carried on the rotating seaming head of the canning machine. The seaming rolls 31 move in against the seaming flange assembly as the seaming head rotates and form the seam by rolling the assembled flanges downwardly and into coiled relation as shown in FIGURE 5. The seaming rolls 31 carry a cutting blade or knife edge 32 at the lower terminus of the seaming groove 33 which trims the excess material from the marginal portion 23 of the cover sheet 22. When the seaming operation is completed the assembly is removed from the canning machine and the completed package is lifted out of the form 26. Preferably, the canning machine is a vacuum type and the seaming operation is carried out in a closed chamber under vacuum.

The container 11 and the sealing or seam forming ring 20 may be of the same materials and preferably are formed from a single sheet of stock material as illustrated in FIGURES 6 to 10. The sheet 35 (FIGURE 6) will be selected from stock of the proper gauge to give the desired thickness in the walls of the container 11 and the sealing ring 20 after the preforming operation. The sheet 35 is drawn or shaped between a pair of dies (not shown) to provide the open top cup or pan-like container 36 (FIGURE 7) with a peripheral flange formation 37 which is preferably drawn to provide the cross section of the ring 20 (FIGURE 8). The flange section 37 is then separated from the body 36 on the cutting line indicated at 38 leaving the completely preformed sealing ring 20 and the body portion 36. The latter is then subjected to a second forming operation between a pair of suitable forming dies (not shown) to provide the pie pan shaped container 11 as shown in FIGURE 10 with the peripheral stepped flange formation 14 which has been described. This procedure for forming the sealing ring 20 and the pan-like container 11 provides an economical method of obtaining these two package elements from a minimum of stock material with a minimum of forming or drawing operations. This procedure is followed in preparing the pan and ring elements when these two elements are formed of the same material, such as, light gauge aluminum or steel.

The sealing ring 20 may be provided with a suitable sealing or gasket material 41, as illustrated in FIGURE 11, in the downwardly facing channel-like pocket formed in the seaming flange formation 18 which will serve as a friction ring to grip the plastic cover sheet 22 and more securely hold the same in proper position for forming the rolled or crimped seam and which may also serve as a sealant for increasing the effectiveness of the seam. Several such materials are known and used commercially. For example, the gasket material may be a rubber base gasket emulsion.

A form of the package is illustrated in FIGURES 12 to 14 which is particularly adapted for food or similar perishable products of a type which it is desirable to enclose in a package from which substantially all air is withdrawn or an inert gas substituted therefor or which are intended to be heated before serving or which may be packaged in a partially processed state and the processing completed before the product is removed from the package. In this form, the package comprises a quantity of the product 50, for example, small sausages, cocktail type wieners, or the like, supported in an open top container 51 formed of relatively light but deformable metal, plastic or like material, having a bottom 52 and an upwardly and outwardly inclined side wall section 53 which terminates at its top edge in an outwardly directed stepped flange formation 54. The flange formation 54 includes a narrow inner flange 55 which is in a plane generally parallel with the bottom wall 52, a narrow upwardly and outwardly inclined peripheral wall section 56 and an outwardly extending seaming flange 57 which, as shown in FIGURE 14, is coiled into tight seam forming relation with a cooperating outwardly extending flange formation 58 on a seaming ring 60. The seaming or sealing ring 60 is preferably formed of relatively rigid but deformable metal and has a narrow inwardly directed flange formation 61 which is adapted to be seated on the inner flange 55 of the container 51. The inner edge of the flange formation 61 defines a center opening 59 of a size corresponding approximately to the opening at the top of the body of the container 51 as shown in FIGURE 14. A sheet 62 of film material is interposed between the container 51 and the sealing ring 60 so as to form a cover for the entire open top of the container 51 and the opening 59 in the seam sealing ring 60, with the marginal portions 63 of the cover sheet 62 being reversely coiled about the ends of the seaming flange formations 57 and 58 so that it is tightly clamped between the same, preferably, with a suitable sealing or gasket material 71, for example, a rubber base gasket emulsion, which increases the effectiveness of the seam. The film material is of a flexible and deformable character which may be drawn into tight conformity with the top surface presented by the product 50, which has a very low gas transmission rate, which will withstand moderately high temperatures and high vacuum without rupture, and which will permit expansion of the product during or following cooking, chilling or other processing operations. The film may be "Mylar" (an oriented linear polyester resin), "Saran" (a vinylidene chloride polymer), supercooled "Saran," polyethylene, vinyl, cellulose acetate, or any other suitable film.

The package of FIGURE 12 is formed following generally the procedure employed in the form of the package of FIGURE 1. The product 50 is placed in the container 51 and the container is supported in a suitable form (not shown). The film sheet 52 is placed over the top of the container 51 (FIGURE 13) and the margins pressed onto the gasket material 71 which is preferably tacky and has been previously applied to the top surface of the flange 57. The apertured closure 60 is put in position and the assembly is moved into the vacuum sealing head. The adhesive-like gasket material holds the film 62 in position as it advances into the sealing head and prevents the film from pulling out at the edges, especially when a thin film is employed. The sealing head is evacuated and a coiled seam is formed in the same manner as in FIGURES 4 and 5. The film under vacuum is pulled tight against the uppermost or exposed surfaces of the product and even against the marginal portions of the wall 53 if the latter is exposed due to the arrangement of the product components, such as the sausages 50. The film forms not only a flexible side of the finished package but conforms to the top surface of the product thus eliminating head space and virtually eliminate spoilage in the top surface area. The top of the product is visible through the film covered opening 59 and can be readily removed therethrough when the film is removed. Since the film is clamped between two rigid elements with the inner edge of the inner flange 61 on the sealing ring vertically aligned with the inner edge of the flange 55 of the container the film is most easily cut with a knife along the edge of the opening 59 to provide an unobstructed opening for removing the contents of the container therethrough in a solid mass.

The shape of the package is not limited to that shown in the drawings. The container may be any shape having rounded or radially determined corners so that a closure seam may be formed by crimping or rolling the flanges at the top of the container and the top closure members, the latter being, of course, formed with flanges which mate with the flanges on the container, for example, it may be oval or it may be rectangular with rounded corners.

The package components may be varied depending upon the product to be enclosed, particular processing methods and the possible use or handling of the package after it is completed. The plastic film is selected to provide a yieldable diaphragm-like end wall which permits expansion and contraction of the contents under changing pressure and moisture conditions such as encountered in retorting and subsequent chilling operations, which enables the maintaining of pressure on the contents during processing and which, in the case of sausage emulsion-type products, is sufficient to prevent fat-water separation, and which permits the processing to be conducted after vacuumizing and hermetically sealing so as to maintain desired portions of the product next to the film, in the case of certain mixed products, by initially placing the desired portions so that they rest on the film when the package is inverted and processing the package in that position.

While particular materials and specific details of construction have been referred to in describing the illustrated forms of the package and the method of forming the same, other materials having the required characteristics and equivalent details of construction may be employed within the spirit of the invention.

We claim:

1. A vacuumized, hermetically sealed food package which comprises a quantity of a food product, a receptacle containing the food which receptacle is in the form of a tray with its top open and having an edge flange formation extending outwardly and upwardly of its top marginal edge, said receptacle being preformed of a relatively rigid and relatively thin gauge metal to provide a product accommodating body portion and relatively narrow inner and outer top edge flange portions which are connected by a relatively narrow vertical wall section extending upwardly of said inner flange portion, a top closure member which is also preformed of a relatively rigid and a relatively thin gauge metal with a depressed apertured center portion and an outwardly extending edge flange formation having a cross section providing a downwardly facing pocket, said closure member being positioned over the open top of said receptacle with its edge flange formation superimposed on the edge flange portions of said receptacle so that the outer flange portion of said receptacle is seated in said pocket and the marginal edge of the aperture in the center portion is vertically aligned approximately with the inner edge of the inner flange portion of the receptacle, a sheet of flexible transparent plastic film which is characterized by a very low gas transmission rate stretched over the product in the receptacle so as to conform to the top of the product and having its marginal portions interposed between the flange portions of said receptacle and the flange formation of said top closure, a gasket material in said pocket which has frictional characteristics so as to grip said film and hold it stretched over the product, said flange portions and said flange formation being in tightly coiled hermetic seam forming relation with the marginal portions of the film trapped between the same whereby said plastic sheet may be cut along the edge of the center aperture in said closure member to permit the product to be readily removed from the receptacle as a solid mass through the center aperture in the closure member.

2. A vacuumized, hermetically sealed food package which comprises a quantity of a food product, a receptacle filled with said product which receptacle is in the form of an open top tray having a bottom wall, an upstanding side wall and a stepped flange formation extending outwardly and upwardly at the top marginal edge of the side wall, said tray being preformed of a relatively thin gauge deformable material to provide the marginal flange formation with relatively narrow inner and outer flange portions connected by a relatively narrow, vertically disposed wall forming section, a top closure member formed of relatively thin gauge metal with an aperture in the center and an edge flange formation having inner and outer flange portions complementary to the corresponding portions of the stepped flange formation on said tray, said closure member being positioned over the top of said tray so that the edge portions defining the center aperture are vertically aligned with the inner edges of the inner flanges of the tray and with a sheet of flexible transparent plastic film covering the food therein and the aperture in the center of the closure member, said plastic film having its marginal portions interposed between the inner and outer flange portions of said tray and the inner and outer flange portions of said closure member, and the outer flange portions of said flange formations being in tightly coiled seam forming relation with the marginal portions of said plastic film tightly compressed between and forming a sealing gasket between said flange portions.

3. A vacuumized, hermetically sealed package which comprises a quantity of a food product, a receptacle containing the product which is in the form of an open top tray having a bottom, a side wall and a stepped flange formation extending outwardly at the top marginal edge of the side wall, said tray being preformed of a relatively thin gauge deformable material having substantial rigidity with the marginal stepped flange formation comprising relatively narrow, vertically spaced inner and outer flange portions connected by a vertically extending narrow wall section of greater diameter than the side wall at its top edge, a sheet of flexible transparent plastic film positioned over the product in the tray and the marginal flange formation on said tray, a top closure member which is preformed of relatively thin gauge deformable material having substantial rigidity with an apertured center portion which is depressed relative to a marginal flange formation having a cross section corresponding to the cross section of the outer flange portion of the stepped flange formation on said tray, said closure member being positioned on said tray with the marginal flange formation seated on the stepped flange formation on the tray so that the edge portions defining the center aperture are vertically aligned with the inner edges of the inner flanges of the tray, and said flange formations and the marginal portions of said plastic film being coiled into tight seam forming relation.

4. A vacuumized, hermetically sealed food package which comprises a quantity of a food product, a receptacle containing the food which receptacle has a top opening with a flange formation extending outwardly and upwardly of its top marginal edge, said receptacle being of a relatively rigid and relatively thin gauge metal to provide a product accommodating body portion and relatively narrow inner and outer top flange portions which are connected by a relatively narrow, vertical wall section extending upwardly of said inner flange portion, a top closure member which is also of a relatively rigid and a relatively thin gauge metal with an apertured center portion and an outwardly extending marginal flange formation having a cross section providing a downwardly facing pocket, said closure member being positioned over the receptacle top opening with its marginal flange formation superimposed on the flange portions of said receptacle so that the outer flange portion of said receptacle is seated in said pocket and the marginal edge of the aperture in the center portion is vertically aligned approximately with the inner edge of the inner flange portion of the receptacle, a sheet of flexible transparent plastic film which is characterized by a very low gas transmission rate stretched over the product in the receptacle so as to conform to the top of the product and having its marginal portions clamped between the flange portions of said receptacle and the flange formation of said top closure together with a gasket material which has frictional characteristics so as to grip said film and hold it stretched over the product, said flange portions, said flange formation and the marginal portions of said film being in tightly coiled, hermetic seam forming relation whereby said film may be cut along the edge of the center aperture in said closure member to permit the product to be readily removed from the receptacle as a solid mass through the center aperture in the closure member.

5. An hermetically sealed food package which comprises a quantity of a food product, a receptacle substantially filled with said product which receptacle has a bottom wall, an upstanding side wall section and a flange formation extending outwardly and upwardly at the top marginal edge of the side wall section, said receptacle being formed of a relatively thin gauge deformable material and said flange formation comprising relatively narrow inner and outer flange portions connected by a relatively narrow, vertically disposed wall forming section, a top closure member formed of relatively thin gauge metal with an open center and an edge flange formation having inner and outer flange portions generally complementary to the corresponding portions of the flange formation on said receptacle, said closure member being positioned over the top of said receptacle so that the inner edge of the edge flange formation of said closure member is vertically aligned with the inner edge of the inner flange portion of the receptacle and a sheet of flexible transparent plastic film covering the top of the food product and the open center of the closure member, said plastic film having its marginal portions trapped between the flange formations of said receptacle and said closure member, and the outer portions of said flange formations being in tightly coiled seam forming relation with the marginal portions of said plastic film in tightly compressed gasket forming relation between said outer portions of said flange formations.

6. An hermetically sealed package which comprises a quantity of a food product, a receptacle containing the product which has a bottom, an upstanding side wall section and a stepped flange formation extending outwardly at the top marginal edge thereof, said receptacle being formed of a relatively thin gauge deformable material having substantial rigidity with the marginal stepped flange formation comprising relatively narrow, vertically spaced inner and outer flange portions which are connected by a vertically extending narrow wall section of greater diameter than the top edge of the side wall section, a sheet of flexible transparent plastic film positioned over the top of the receptacle and the marginal flange formation therein, a top closure member which is preformed of relatively thin gauge deformable material having substantial rigidity with an apertured center portion which is depressed relative to the marginal flange formation and which has a cross section corresponding approximately to the cross section of the outer portion of said stepped flange formation, said closure member being positioned on said receptacle with its marginal flange formation seated on said stepped flange formation so that the edge portions defining the center aperture in said closure member are vertically aligned with the inner edge portions of the inner flange of said stepped flange formation, and said flange formations and the marginal portions of said plastic film being coiled into tight seam forming relation.

7. An hermetically sealed food package which comprises a receptacle, a quantity of a food product in the receptacle which is characterized by pieces of the product at the top surface forming an irregular contour, said receptacle having an open top with an edge flange formation extending outwardly and upwardly of the top marginal edge, said receptacle being formed of a relatively rigid and relatively thin gauge material to provide a product accommodating body portion and relatively narrow inner and outer top edge flange portions which are connected by a relatively narrow vertical wall section extending upwardly of said inner flange portion, a top closure member which is also formed of a relatively rigid and a relatively thin gauge material with a depressed apertured center portion and an outwardly extending edge flange formation having a cross section providing a downwardly facing pocket, said closure member being positioned over the open top of said receptacle with its edge flange formation superimposed on the edge flange portions of said receptacle so that the outer flange portion of said receptacle is seated in said pocket and the marginal edge of the aperture in the center portion is vertically aligned approximately with the inner edge of the inner flange portion of the receptacle, a sheet of flexible transparent plastic film which is stretchable and which has a very low gas transmission rate covering the product in the receptacle and the apertured center of said closure member, said film material being tightly drawn over the topmost pieces of the product so as to conform to exposed surfaces thereof, the marginal portions of said film being disposed between the flange portions of said receptacle and the flange formation of said top closure, a gasket material which has frictional characteristics being deposited on the outer top edge flange portion of said receptacle body so as to grip said film and hold it stretched over the product, said flange portions and said flange formation being in tightly coiled hermetic seam forming relation with the marginal portions of the film clamped in seal forming relation between the same.

8. An hermetically sealed package which comprises a receptacle having a bottom, a side wall and a stepped flange formation extending outwardly at the top marginal edge of the side wall, said receptacle being formed of a relatively thin gauge deformable material having substantial rigidity with the stepped flange formation which surrounds the open top of the receptacle comprising relatively narrow, vertically spaced inner and outer flange portions connected by a vertically extending narrow wall section of greater diameter than the side wall at its top edge, a quantity of a food product substantially filling the receptacle, a sheet of flexible transparent plastic film positioned over the top of the product and said marginal flange formation, a top closure member which is preformed of relatively thin gauge metal having substantial rigidity with an apertured center portion which is depressed relative to a marginal flange formation, said closure member having a cross section at its margins corresponding approximately to the cross section of said outer flange portion of the stepped flange formation, said closure member being positioned on the top of said receptacle with the marginal flange formation seated on the stepped flange formation so that the inner edge portions defining the center aperture are vertically aligned with the inner edges of the inner flanges of the receptacle whereby to permit removal of the product without interference by said inner edge portions when the plastic film is cut out along said inner edge portions, and said flange formations and the marginal portions of said plastic film being coiled into tight seam forming relation.

9. An hermetically sealed food package which comprises a quantity of a food product, a receptacle filled with said product which receptacle has a bottom wall, an upstanding side wall section and a flange formation extending outwardly and upwardly at the top marginal edge of the side wall section, said receptacle being formed of a relatively thin gauge deformable material and said flange formation comprising relatively narrow inner and outer flange portions connected by a relatively narrow, vertically disposed wall forming section, a top closure member formed of relatively thin gauge metal with an open center and an edge flange formation having inner and outer flange portions complementary to the corresponding portions of the flange formation on said tray, said closure member being positioned over the top of said receptacle so that the inner edge of the edge flange formation of said closure member is aligned substantially with the inner edge of the inner flange portion of the receptacle and with a sheet of flexible transparent plastic film which is stretchable covering the food therein and the open center of the closure member, said plastic film having its marginal portions trapped between the flange formations of said receptacle and said closure member, the outer portions of said flange formations being in tightly coiled seam forming relation with the marginal portions of said plastic film in tightly compressed gasket forming relation between said outer portions of said flange formations and said plastic film being stretched tightly over the top of the product so that it conforms to the top surface thereof thereby eliminating head space and providing a deformable and yieldable diaphragm-like end wall which permits expansion and contraction of the contents under packaging pressure and moisture conditions.

10. An hermetically sealed food package which comprises a quantity of a food product, a receptacle containing the product which has a bottom, an upstanding side wall section and a stepped flange formation extending outwardly at the top marginal edge thereof, said receptacle being formed of a relatively thin gauge deformable material having substantial rigidity with the marginal stepped flange formation comprising relatively narrow, vertically spaced inner and outer flange portions which are connected by a vertically extending, narrow wall section of greater diameter than the top edge of the side wall section, a sheet of flexible transparent, stretchable, plastic film positioned over the top of the receptacle and the marginal flange formation thereof, a top closure member which is preformed of relatively thin gauge deformable material having substantial rigidity with an apertured center portion which is depressed relative to a marginal flange formation and which has a cross section corresponding to the cross section of the outer portion of said stepped flange formation, said closure member being positioned on said receptacle with its marginal flange formation seated on said stepped flange formation so that the edge portions defining the center aperture in said closure member are vertically aligned with the inner edge portions of the inner flange of said stepped flange formation, and said flange formations and the marginal portions of said plastic film being coiled into tight seam forming relation, said plastic film being tightly drawn over the top of the product so as to conform to the surface thereof whereby to eliminate head space and provide a deformable and yieldable diaphragm-like end wall.

References Cited in the file of this patent
UNITED STATES PATENTS

| | | |
|---|---|---|
| 1,955,745 | Hurley | Apr. 24, 1934 |
| 2,652,148 | Pfeifer | Sept. 15, 1953 |
| 2,747,784 | Gandrean | May 29, 1956 |
| 2,775,383 | Kollman et al. | Dec. 25, 1956 |